United States Patent [19]

Mizogui

[11] Patent Number: 4,529,291
[45] Date of Patent: Jul. 16, 1985

[54] EXPOSURE MODE CONTROL DEVICE FOR CAMERA

[75] Inventor: Toyokazu Mizogui, Tokyo, Japan

[73] Assignee: Canon Kabushiki Kaisha, Tokyo, Japan

[21] Appl. No.: 582,865

[22] Filed: Feb. 27, 1984

Related U.S. Application Data

[63] Continuation of Ser. No. 313,504, Oct. 21, 1981, abandoned.

[30] Foreign Application Priority Data

Nov. 1, 1980 [JP] Japan .................... 55-154016

[51] Int. Cl.³ .............................. G03B 17/18
[52] U.S. Cl. .................... 354/443; 354/289.1
[58] Field of Search ............. 354/442, 443, 195.13, 354/273, 289.1, 289.11

[56] References Cited

U.S. PATENT DOCUMENTS

| | | | |
|---|---|---|---|
| 2,917,984 | 12/1959 | Faulhaber | 354/289.1 |
| 4,106,033 | 8/1978 | Nakamoto et al. | 354/60 L |
| 4,172,651 | 10/1979 | Wiessner et al. | 354/60 L X |
| 4,279,481 | 7/1981 | Ishibashi et al. | 354/53 X |
| 4,286,849 | 9/1981 | Uchidoi | 354/289 X |
| 4,294,529 | 10/1981 | Sato et al. | 354/53 |
| 4,329,029 | 5/1982 | Haskell | 354/443 |

FOREIGN PATENT DOCUMENTS 1223694 8/1966 Fed. Rep. of Germany .
2460804 6/1976 Fed. Rep. of Germany .

OTHER PUBLICATIONS

Canon A-1 Operator's Manual, Apr. 1978.

Primary Examiner—William B. Perkey
Attorney, Agent, or Firm—Toren, McGeady, Stanger, Goldberg & Kiel

[57] ABSTRACT

The disclosed automatic exposure control camera is capable of operating in various exposure modes. In the exposure mode control device, a number of selectable switches select one of a number of imaging effects. An exposure mode selector arrangement holds a signal corresponding to which of the switches is operated until the exposure is terminated. An exposure controller controls exposures in the different exposure modes and selects an exposure mode based on the signal from the exposure selector. Each of the switches has a pictograph as an indication of the imaging effect being selected by that switch. According to an embodiment of the invention, an indicator in the camera displays a pictograph representing the imaging effect to be obtained in the selected exposure mode on the basis of the signal from the exposure mode selector.

4 Claims, 6 Drawing Figures

EXPOSURE MODE CONTROL DEVICE FOR CAMERA

This application is a continuation of application Ser. No. 313,504, filed Oct. 21, 1981, now abandoned.

BACKGROUND OF THE INVENTION

1. Field of the Invention

This invention relates to cameras, and particularly to exposure mode control devices for cameras having a plurality of exposure modes that produce different imaging effects.

2. Description of Prior Art

Recent advances in the electronic and mechanical automation of cameras has resulted in proposals for multi-mode cameras capable of operating in various exposure control modes which are selected by actuation of a selection control member. Some cameras of this type have been realized and are already available. The switchover arrangements for switching between exposure control modes in such multi-mode cameras are in the form of either a lever cooperating with a switching arrangement or a push-button. Conventional cameras indicate these modes on the actuator and in the view field of the camera's finder by using letters and symbols. Recognizing at a glance what these letters and symbols indicate has been inconvenient. On the other hand, pictographs have been used in cameras for indicating distances visually and for setting the cameras, by representing a mountain or a person on the distance or focusing scale. Also, patterns representing the flash mode are used. Exposure control modes are indicated with letters, such as M for manual mode, AV for aperture priority automatic exposure mode, TV for shutter priority automatic exposure mode, and P for program mode. This manner of indication has made exposure control modes difficult to select properly.

SUMMARY OF THE INVENTION

With the foregoing in mind, it is an object of the present invention to provide a multimode exposure control camera with an exposure mode control device enabling the operator to readily select a corresponding one of the exposure control modes to the desired imaging effectiveness.

BRIEF DESCRIPTION OF THE PREFERRED EMBODIMENT

The present invention is next described in greater detail in connection with an embodiment thereof by reference to the drawings.

Figure 1:
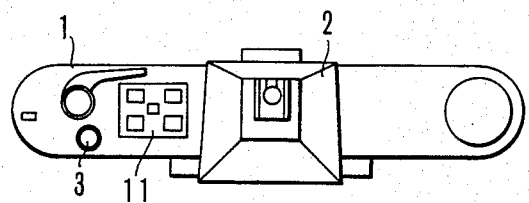
FIG. 1 is a plan view of a camera embodying the present invention.
Figure 2:
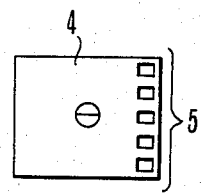
FIG. 2 is a plan view illustrating the view field of the finder of the camera of FIG. 1.
Figure 3:
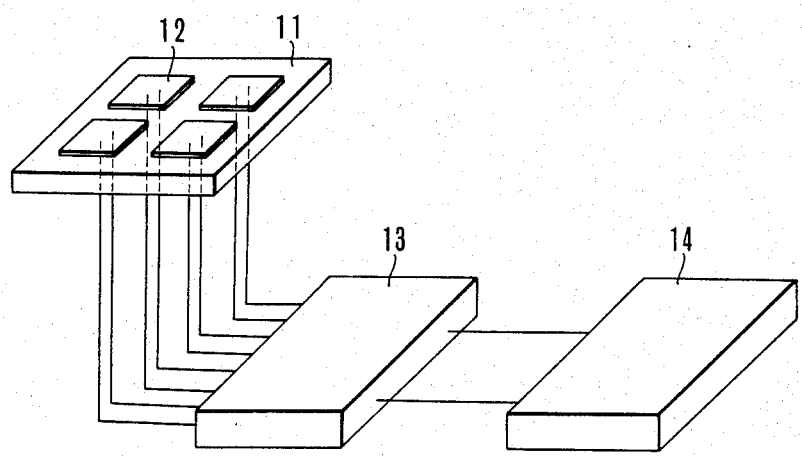
FIG. 3 is a schematic perspective view illustrating the exposure mode control device embodying the invention.

In FIG. 1, a camera body 1 includes a pentaprism portion 2 and a release button 3 arranged on its upper surface. Situated on one side (right hand operating side) of the pentaprism portion 2 is an exposure mode selection control portion 11. This control portion 11 is provided with a plurality of push button switches 12 of which the surfaces bear pictographs representing imaging effectiveness obtainable in the selected exposure modes as will be more fully described. In FIG. 3, an exposure mode selection circuit 13 responds to actuation of the push button switch 12 for producing an output signal representative of the selected exposure mode. An exposure control circuit 14 capable of controlling exposure in a plurality of modes, in other words, along a plurality of program lines, is constructed so that the exposure mode is switched by the output of the exposure mode selection circuit 13. Turning to FIG. 2, one side margin of a view field of the finder of the camera body 1 is provided with an indicator portion 5. This indicator portion 5 as will be described presents an indication of the mode selected by the push button switch 12, by lighting a pictograph representing the imaging effect to be obtained in that exposure mode.

Figure 4:
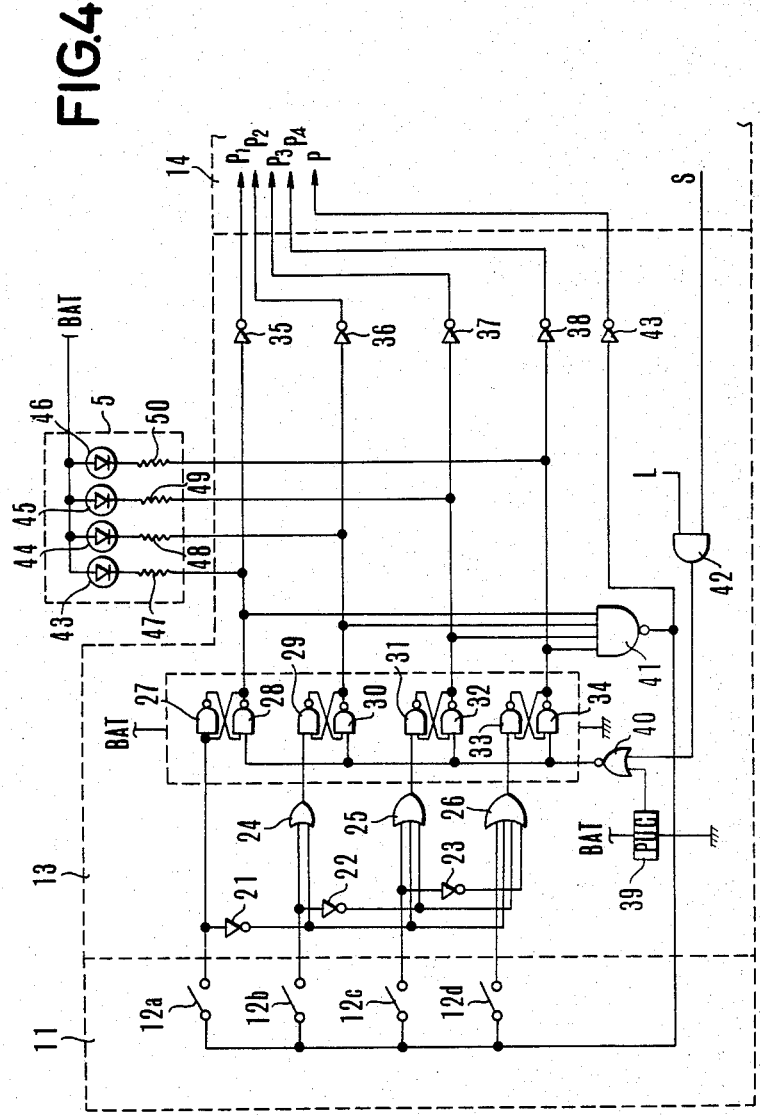
FIG. 4 is a diagram of a switching circuit in the device of FIG. 3.

FIG. 4 illustrates the electrical details of an embodiment of the invention. In this drawing, the similar parts to those of the foregoing drawings carry the same reference numerals. This circuit includes switches 12a to 12d which are to be changed by the aforesaid push button switch 12; inverters 21-23; and OR gates 24-26. The OR gate 24 being connected to inverter 21 and switch 12b, OR gate 25 to inverters 21 and 22 and switch 12c, and OR gate 26 to inverters 21-23 and switch 12d so that the switches 12a-12d are priority-weighted. That is, when switches 12a and 12b are actuated simultaneously, only the low level signal produced at the terminal of switch 12a is fed to a latch circuit to be described. NAND gates 27 and 28 form a first latch circuit for the switch 12a, NAND gates 29 and 30 a second latch circuit for the switch 12b, NAND gates 31 and 32 a third latch circuit for the switch 12c, and NAND gates 33 and 34 form a fourth latch circuit for the switch 12d. Inverters 35-38 invert the outputs from the aforesaid latch circuits to produce exposure mode selection signals with their outputs P1-P4 causing the exposure mode, or program line of the exposure control circuit 14, to change.

A pulse generating circuit 39 responsive to closure of an electrical power supply control switch (not shown) produces an output signal of high level for a predetermined time. The circuit 39 is connected through a NOR gate 40 to the NAND gates 28, 30, 32 and 34. Therefore, when the electrical power source switch is thrown, the latch circuits of the NAND gates 27-34 are reset and their outputs become high. A NAND gate 41 includes inputs which are connected to the outputs of the latch circuits, that is, of the NAND gates 28, 30, 32 and 34 and also an output which is connected to the switches 12a-12d. The output of the NAND gate 41 is fed through an inverter 43 to the exposure control circuit 14 where it is used as a signal P for setting the exposure control circuit 14 in the normal exposure mode. The circuit includes an AND gate 42 having an output which is connected to the NOR gate 40 and two inputs, one of which is receptive of a signal S representing the termination of run down movement of the shutter which assumes a high level for a predetermined time after the shutter has run down, and the other of which is receptive of a release signal L which assumes a low level for a time when the release button 3 of the camera is in the depressed position.

Members 43–46 are light-emitting diodes (hereinafter referred to as LEDs) for illuminating the pictographs in the indicator portion 5, and these LEDs are connected through respective resistors 47 to 50 to the NAND gates 28, 30, 32 and 34.

The operation of the thus constructed device is as follows when selectively actuating the switch 12b. When the power switch (not shown) is turned on to supply current to the entire circuitry, at first, the output of the pulse generating circuit 39 changes to and is maintained high for a predetermined time. In response to this, the NOR circuit 40 changes its output to a low level which is maintained for a predetermined time. Hence, the latch circuits of the NAND gates 27–34 all are reset and their outputs go high. Since, at this time, the output of the NAND gate 41 becomes low, the exposure mode selection circuit 13 has only the output P at a high level, thus setting the exposure control circuit 14 in the normal exposure mode. With this, therefore, when the release button 3 is pushed down, an ordinary program shot goes on.

When this condition is followed by actuation of the switch 12b, this results in application of a signal of low level to the input terminal of NAND gate 29. Then, the second latch circuits formed by the NAND gates 29 and 30 is inverted and its output is maintained at a low level. Therefore, the output P2 becomes high, so that the exposure mode of the exposure control circuit 14 is switched, and LED 44 is lighted to illuminate the pictograph representing the images to be obtained in the selected exposure mode. On the other hand, since the change of the output of NAND gate 30 to low causes change of the output of NAND gate 41 to a high level, the output P becomes low. This also causes one terminal of each of the switches 12a–12d to be of high level, thus prohibiting a subsequent selecting operation.

Then, when the release button 3 is pushed down, an exposure operation is initiated. After the termination of the exposure operation, as the shutter has run down, the aforesaid one of the latch circuits (NAND gates 29 and 30) is reset, and the exposure control circuit 14 regains the normal exposure mode. But in a case where even after the shutter is closed, the release button 3 continues being depressed to make a continuous series of shots, the AND gate 42 is closed so that the subsequent exposure operations are carried out in the same mode. It should be pointed out that the operator is aided in the decision of when to select the switches 12a–12d, by the pictograph representing the desired imaging effect.

Figure 5:
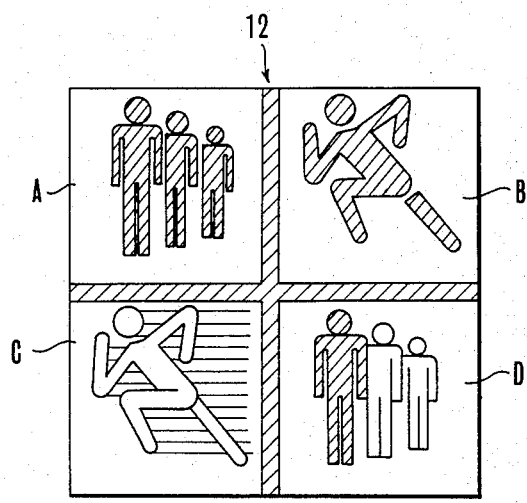
FIG. 5 illustrates an example of a combination of pictographs used in the embodiment of the invention.
Figure 6:
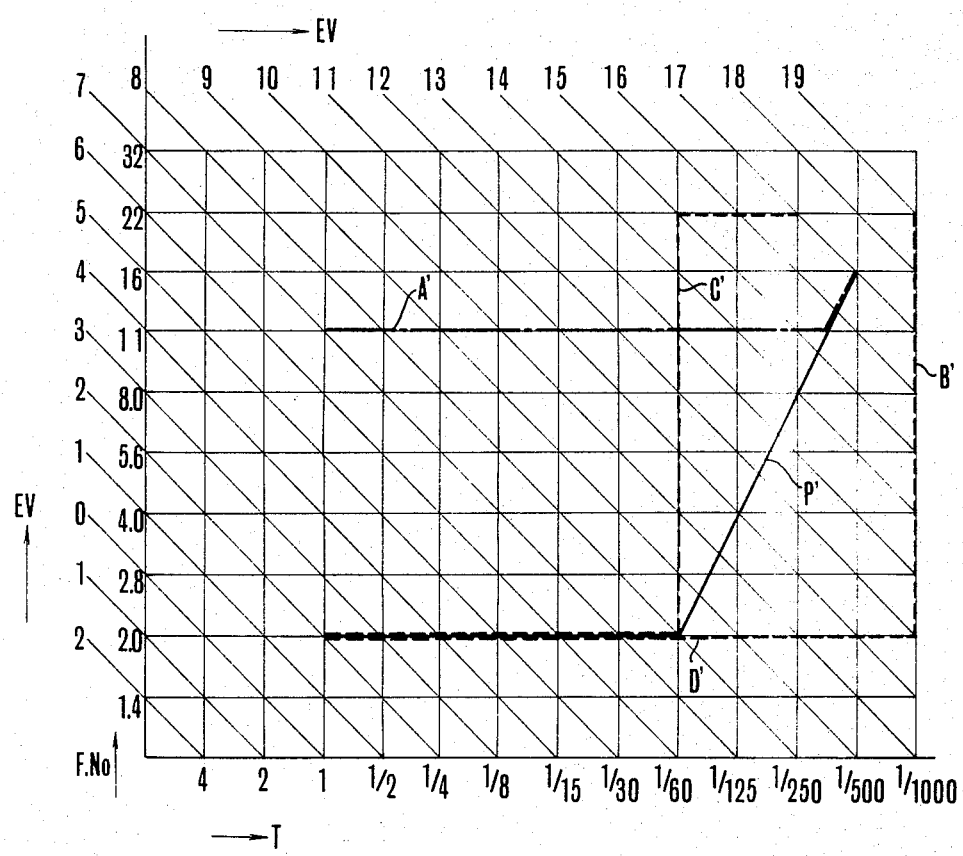
FIG. 6 is a graph illustrating an example of program lines corresponding to the pictographs of FIG. 5.

The manner in which the exposure modes (program lines) are selected and an example of pictographs representing the imaging effects available from these exposure modes may be understood by reference to FIGS. 5 and 6. In FIG. 5, pictographs A to D are provided on the respective switches 12a–12d, the A representing pan-focus exposure mode, the B stop motion mode, C panning shot mode, and the D an exposure mode suitable for an exposure with the shallow depth of focus. Thus, pictograph A is illustrated for image effects in which the depth of focus is deepened and the diaphragm is closed down to a small value, or that is assured when in the aperture priority exposure mode, B for setting of the shutter time to a faster value as in the shutter time priority exposure mode, C for setting of the shutter time to a slower value as in the shutter priority exposure mode, and D for setting the diaphragm aperture to an appropriate value as in the aperture priority exposure mode. This makes it possible for the operator to understand the exposure modes of the camera quickly and easily.

FIG. 6 also illustrates an example of program lines corresponding to the pictographs as shown above. In this graph, the ordinate represents the aperture value (F-number), and the abscissa the shutter time (T). The slant lines represent parameters in EV values. In the graph, P′ represents an ordinary program line. When the push button switch 12 is not actuated, as shown in connection with the embodiment of FIG. 4, the exposure is controlled along this line. Also, the program line A′ corresponds to pictograph A, the program line B′ to pictograph B, the program line C′ to pictograph C, and the program line D′ to pictograph D. If such pictographs are depicted on the respective patches of the push button switch 12, and the program lines to be selected in response thereto follow as in FIG. 6, it becomes possible to determine which exposure modes to use depending upon the photographic situations.

Again, in FIG. 6, program line A′ serves to change the shutter time as the EV value changes, while maintaining the constant aperture value at F/11, so that despite variation of the EV value, images of a deep depth of focus can always be obtained. Similarly, program lines B′, while maintaining the constant shutter time at 1/1000 sec. changes the diaphragm aperture with variations in the EV value, so that despite the variation of the EV value, objects can always be imaged to look like they are at a standstill. Also, program line C′, while maintaining the constant shutter time at 1/60 sec., varies the aperture value with changes of the EV value. Program line D′, while maintaining the used objective lens at a fully open aperture (in this instance, the fully open aperture of the lens is F/2) changes the shutter time with variations of the EV value. These modes cover a wide range of imaging effects for action-impressive images and out-of-focus accented images.

It is to be noted that though the present embodiment has been described in connection with the particular location of the pictographs at the push button switch 12 for the purpose of indicating the imaging effects obtainable by each switch element, the pictographs may be otherwise located, for example, on the control panel 11 in registry with the push button switch elements 12. It is also possible to change the location of the indicator 5 to the outside of the view field of the finder, for example, on the back cover of the camera body 1.

As has been described in greater detail, in the camera employing the exposure mode control device of the invention, when the ordinary exposure program line does not allow for imaging effectiveness intended by the photographer to be obtained, the photographer is able to alter the program line by operating the mode selector button. And, when doing this, the pictographs provided on the selection control panel assist the photographer in readily searching out where the actuator for the desired imaging effectiveness is. Further, since the indication of the selected mode is also provided in the finder, it is possible to produce a photograph with the imaging effectiveness intended by the photographer without fail and independently of the degree of experience of the photographer.

What is claimed is:

1. An exposure control device for a camera comprising:

(a) exposure control means for automatically determining an aperture value and a shutter time in accordance with the EV along a program line, said exposure control means having a plurality of types of said program lines at least one of said types of program lines being a first program line for setting the shutter time at high speeds, and another being a second program for setting the shutter time at slow speeds;

(b) a control signal generating circuit for producing a control signal to said exposure control circuit to indicate one program line out of the aforesaid plurality of types of program lines and to operate said exposure control circuit along that indicated program line;

(c) selecting means accessible from the outside of the camera for selecting one program line of said plural kinds of program lines which gives a characteristic image state which the photographer hopes to obtain to the photographic result so that responsive to a selecting operation of said selecting means, said control signal generating means produces the aforesaid control signal and said exposure control circuit is operated along the selected one program line by said selecting means; and (d) a plurality of pictographs on the camera to guide the selecting operation of said selecting means, at least one of said pictographs being a first pictograph assisting in foreseeing concretely the imaging effect of photographs having a stop motion, and another being a second pictograph assisting in foreseeing concretely the image effect of photographs having movement, said first pictograph being arranged to guide the selecting operation of said first program line, and said second pictograph is arranged to guide the selecting operation of said second program line.

2. A device according to claim 1, wherein the pictograph is represented by an image of a person.

3. A device according to claim 1, wherein said pictographs are arranged between a pentaprism portion of the camera and a release button.

4. An exposure control device for a camera comprising:

(a) exposure control means for automatically determining an aperture value and a shutter time in accordance with the EV along a program line, said exposure control means having a plurality of types of said program lines at least one of said types of program lines being a first program line for setting the shutter time at high speeds, and another being a second program for setting the shutter time at slow speeds;

(b) a control signal generating circuit for producing a control signal to said exposure control circuit to indicate one program line out of the aforesaid plurality of types of program lines and to operate said exposure control circuit along that indicated program line;

(c) selecting means accessible from the outside of the camera for selecting one program line of said plural kinds of program lines which gives a characteristic image state which the photographer hopes to obtain to the photographic result so that responsive to a selecting operation of said selecting means, said control signal generating means produces the aforesaid control signal and said exposure control circuit is operated along the selected one program line by said selecting means; and (d) a plurality of pictographs on said camera to guide the selecting operation of said selecting means, at least one of said pictographs being a first pictograph which represents that even when the shooting target area includes a moving object, in a photograph to be taken, the entire field of view is photographed at a standstill, with the moving object depicted as stopping in a certain condition, and at least another one of said pictographs being a second pictograph which represents that when the shooting target area includes a moving object, in a photograph to be taken, only the moving object is photographed at standstill and the stationary background as if it were moving with the moving object depicted as stopping in a certain condition and the background as blurred, so that said first pictograph guides the selecting operation of said first program line, and said second pictograph guides the selecting operation of said second program line.

* * * * *